(12) United States Patent
Kawan

(10) Patent No.: US 6,913,193 B1
(45) Date of Patent: Jul. 5, 2005

(54) METHOD AND SYSTEM OF TRACKING AND PROVIDING AN AUDIT TRAIL OF SMART CARD TRANSACTIONS

(75) Inventor: Joseph C. Kawan, Hollywood, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/238,996

(22) Filed: Jan. 28, 1999

Related U.S. Application Data
(60) Provisional application No. 60/073,090, filed on Jan. 30, 1998.

(51) Int. Cl.[7] .............................................. G06F 17/60
(52) U.S. Cl. .................................................... 235/380
(58) Field of Search .................................... 705/41, 34

(56) References Cited

U.S. PATENT DOCUMENTS

| | | | | | |
|---|---|---|---|---|---|
| 4,092,524 | A | * | 5/1978 | Moreno | 235/419 |
| 4,256,955 | A | * | 3/1981 | Giraud et al. | 235/380 |
| 5,461,217 | A | * | 10/1995 | Claus | 235/380 |
| 5,590,038 | A | * | 12/1996 | Pitroda | 705/41 |
| 5,868,237 | A | * | 2/1999 | Rademacher et al. | 194/217 |
| 5,930,363 | A | * | 7/1999 | Stanford et al. | |
| 5,943,423 | A | * | 8/1999 | Muftic | 380/25 |
| 6,047,267 | A | * | 4/2000 | Owens et al. | 705/34 |
| 6,070,798 | A | * | 6/2000 | Netherly | 713/200 |
| 6,119,229 | A | * | 9/2000 | Martinez | 713/200 |
| 6,230,145 | B1 | * | 5/2001 | Verderamo | 203/35 |
| 6,341,353 | B1 | * | 1/2002 | Herman | 713/201 |

OTHER PUBLICATIONS

Industry Debates Which Medical Payment Records Card are Best–Card News–v8–n1–Jan. 11, 1993.*
"Card Issuers Pan For Gold in the E–Commerce Stream"– Debit Card News–Aug. 3, 1995.*

* cited by examiner

*Primary Examiner*—Geoffrey R. Akers
(74) *Attorney, Agent, or Firm*—George T. Marcou; Kilpatrick Stockton LLP

(57) ABSTRACT

A method and system for tracking and providing an audit trail for off-line smart card transactions includes storing information representing a monetary transaction in a permanent memo on an smart card microprocessor and holding the transaction amount in escrow until the stored information is transmitted from the smart card, for example, at an on-line terminal, to a host on-line system for logging to a tracking system. The monetary transaction includes a transaction with an off-line device, such as another smart card. The escrowed transaction amount represents, for example, a load transaction to one of the smart cards and an unload transaction to other smart card. Once the memo is deleted from the respective smart cards, the load values of the respective smart cards are incremented or decremented by the transaction amount. Alternatively, the smart cards may be provided with a card-to-card key, in which case, a permanent memo is stored only on the receiving smart card.

43 Claims, 9 Drawing Sheets

METHOD AND SYSTEM OF TRACKING AND PROVIDING AN AUDIT TRAIL OF SMART CARD TRANSACTIONS

CROSS REFERENCE TO RELATED APPLICATIONS

This application claims priority to applicant's co-pending application having U.S. Ser. No. 60/073,090 filed Jan. 30, 1998.

FIELD OF THE INVENTION

The present invention relates generally to the field of stored value smart cards and more particularly to a method and system of tracking and providing an audit trail of off-line smart card transactions.

BACKGROUND OF THE INVENTION

Smart cards are currently used for many business transactions. A smart card is typically a plastic card the size of a credit card that is imbedded with a microprocessor chip that makes it "smart." A smart card is capable of adding, deleting, and otherwise manipulating information on the card. In order to use a smart card for a stored value purchase, information representing a load or monetary value must be transferred to the chip imbedded in the card. Normally, the load value is transferred from a host on-line system of a financial institution, such as a bank, to provide an audit trail and to secure a load key. The load key is a secret code used in verifying and authorizing a transaction. There are a number of ways in which on-line connections are made. Generally, an on-line connection is made when a smart card is inserted into any device that is directly or wirelessly connected to the host system. The card can be inserted, for example, into an automated teller machine (ATM) or a merchant terminal which is connected to the host system. Further, the card can be inserted into a card reader attached to a personal computer (PC) which is networked into or connected to the host system.

A load value may also be transferred between two smart cards remotely, or off-line. A remote or off-line transaction is generally made by inserting a card into a device that is not connected to the on-line system at the time the transaction occurs. For example, an electronic purse or wallet, a remote ATM, a merchant terminal, or a PC may be utilized to perform off-line transactions between smart cards. Other similar methods and devices, such as smart card compatible cellular phones, are also used in off-line transactions between cards. Such off-line card-to-card transfers, however, allow for inaccuracies between the host on-line system and the cards involved in the off-line transaction. Additionally, these off-line transfers create opportunities for fraud.

Generally, a smart card transaction results in an immediate update of the load value on the card. With an on-line transaction, the updated load value on the card is also immediately reconciled with the on-line host system of the financial institution or bank which tracks the load value of the card. With an off-line or remote transaction, however, the updated load value of the card is not immediately known by the host on-line system. Thus, a remote transaction between cards potentially may never be known by the on-line system. For example, when an electronic purse or wallet is used to make an off-line transfer between two smart cards, the off-line electronic purse or wallet transfers all or part of the load balance of one smart card to another smart card. A memo documenting the transaction is posted to the transaction log within the memory of each of the smart cards. The smart card transaction log, however, has only a limited capacity to store transaction memos. For example, a VISA Cash Smart Card may be used for up to 32,000 transactions, but the transaction log within the smart card memory is capable of storing only the last 10 transactions. Once the transaction log is filled, a new or succeeding transaction bumps the oldest preceding transaction off the transaction log. Thus, only a very small percentage of the total number of transactions is available for accounting purposes.

This limited ability to store transactions is problematic when a later attempt is made to reconcile and audit account balances after an off-line transaction has occurred. If the transaction memo for the particular off-line transaction is bumped from the transaction log before the smart card connects with the on-line system, then the load balances between the smart card and the on-line system will be different and there is no ability to trace the particular off-line transaction. This problem is compounded since questions and problems associated with one or more transactions are frequently not discovered until well after the transactions have occurred. This increases the likelihood that any record of the transaction in question has already been bumped from the smart card transaction log by the time the question arises. Thus, if something did not go right during the transaction, or if a fraudulent transaction was generated, there is little, if any, ability to trace the transaction because of the limitations of the smart card transaction log.

There is a current need to provide a method and system for tracking off-line smart card transactions, such as off-line card-to-card transactions, which provides an audit trail of the transactions.

SUMMARY OF THE INVENTION

It is a feature and advantage of the present invention to provide a method and system or tracking off line smart card value transfer transactions utilizing an improved memo posting procedure to provide an audit trail of such transactions.

It is a further feature and advantage of the present invention to provide a method and system of tracking and providing an audit trail for off-line card-to-card value transfer transactions which enables reconciliation of the transfer of value between two cards to account for all such transactions and to prevent fraud.

In an embodiment of the present invention, a memo posting system is integrated with the smart card to account for off-line transactions and to reconcile such transactions with an on-line system. In using a smart card for an off-line transaction in an embodiment of the present invention, a permanent memo is posted to the smart card for the amount of the transaction. Similarly, a permanent memo is posted to the device with which the smart card interacts in the transaction. For example, in a smart card-to-smart card transaction, each card has a permanent load or unload memo posted which corresponds to the transaction. Prior to reconciling with the on-line host system, the amount of the permanent load or unload memo is held in escrow on the particular smart card. The permanent load or unload memo amount can be seen, but not accessed, by the cardholder. The permanent memo entry is deleted as required, for instance, once the information in the permanent memo has been transmitted to and stored in the on-line host system, at which time, the permanent memo is no longer needed to be stored on the card.

In an embodiment of the present invention, when a permanent unload memo is posted to a smart card, the card load value balance is reduced by an amount corresponding to the unload memo transaction amount. A cardholder who inquires about the card balance, for example, at a terminal, can see the debit or unreconciled unload memo amount, which reduces the load value balance available to the cardholder. In order to reconcile the smart card load balance and clear the permanent unload memo, the cardholder must make a connection between the smart card and the on-line host system. Thus, even though an official transfer does not occur until the smart card interacts with the on-line system, the unload memo transaction amount is not accessible by the cardholder. Similarly, the amount of an unreconciled load transaction memo is likewise not available to the cardholder. The cardholder can see the credit or unreconciled load amount upon making a balance inquiry, for example, at a terminal. However, the transaction amount represented by the permanent load memo cannot be used by the card holder until the smart card load balance is reconciled with the on-line system. Thus, the method and system of the present invention advantageously promotes frequent interaction with the on-line host system, thereby enhancing the accuracy of the system.

To achieve the stated and other features, advantages and objects, an embodiment of the present invention provides a method and system for tracking and providing an audit trail for smart card transactions in which information representing a monetary transaction is stored in a permanent memo on an application of a microprocessor chip of the smart card of at least a first cardholder. The transaction amount is held in escrow until the stored information is transmitted from the smart card application to a host on-line system, at which time, the permanent memo is deleted from the smart card application. Storing the monetary information involves posting a transaction amount on the smart card application and holding the transaction amount in escrow until the permanent memo is deleted. The escrowed transaction amount is excluded from the load value of the smart card until the memo is deleted. However, the escrowed transaction amount is visible to the cardholder by inserting the smart card, for example, into a terminal and displaying the escrowed transaction amount on a display screen associated with the terminal. Generally, the escrowed transaction amount represents either a load transaction to the smart card or an unload transaction to the smart card. Once the permanent memo is deleted, the smart card load value is incremented by the transaction amount for a load transaction or decremented by the transaction amount for an unload transaction.

In an embodiment of the present invention, the monetary transaction involves, for example, an off-line transaction between the smart card and an off-line device. The stored information, which includes a load key for the off-line device, is transmitted at an on-line terminal from the smart card application to the on-line host system. The on-line host system receives the information and authenticates the load key of the off-line device. The on-line host system also logs the transaction to a tracking system and transmits a message to the smart card application authorizing the deletion of the permanent memo. When the permanent memo is deleted, the load value of the smart card is automatically increased or decreased by the escrowed transaction amount, depending on whether the transaction is a load transaction or an unload transaction.

In an embodiment of the present invention, the off-line device includes, for example, a smart card of a second cardholder, and the information representing the monetary transaction is stored in a permanent memo of the smart card application on the microprocessor chip of the second smart card as well as the first smart card. Likewise, the transaction amount for the transaction is posted on the smart card applications of both smart cards, and the transaction amount is held in escrow on the respective smart cards until the permanent memo is deleted from the respective smart cards. Further, the escrowed transaction amount is excluded from the load value of the respective smart cards. In other words, the load value of the paying smart card is not decremented by the escrowed transaction amount, until the permanent memo is deleted from the paying smart card, and the load value of the receiving smart card is not incremented by the escrowed transaction amount, until the permanent memo is deleted from the receiving smart card. However, the escrowed transaction amount can be viewed by the respective cardholders inserting the respective smart cards into a terminal and displaying the escrowed transaction amount on a display screen associated with the terminal. The escrowed transaction amount represents a load transaction to one of the smart cards as the receiving smart card in the transaction, and an unload transaction to the other smart card as the paying smart card in the transaction.

In an embodiment of the present invention, in the transaction between two smart cards, the stored information includes a load key for each smart card stored in the permanent memo of the other smart card. The stored transaction information is transmitted at a terminal from the respective smart cards to the on-line host system, and the transmitted information in each case includes the load key for the other smart card. The on-line host system receives the transmitted information from the respective smart card applications and authenticates the load key for the other smart card included in the transmitted information from the respective smart cards. Upon receiving and authenticating the transmitted information from the respective smart cards, the on-line system transmits a message to the respective smart cards authorizing deletion of the permanent memo from the respective smart cards. The permanent memo is deleted from the respective smart cards upon receipt of the authorizing messages, respectively. When the permanent memo is deleted from the respective smart cards, the load value of a respective smart card, for example, the paying smart card is decremented, and the load value of the other smart card, for example, the receiving smart card is incremented, by the transaction amount. Upon receiving and authenticating the transmitted information from both smart cards, the on-line system logs a reconciliation of the transaction between the first and second smart cards.

In an embodiment of the present invention, in an off-line transaction between two smart cards, the respective smart cards can each be provided with a card-to-card key. The receiving smart card stores information representing the monetary transaction, along with the card-to-card key for the paying smart card in a permanent memo. However, the paying smart card stores the transaction information in a transaction log rather than a permanent memo. The transaction amount is posted to the smart card applications of both smart cards. The transaction amount is held in escrow on the receiving card until the permanent memo is deleted. However, the load value of the paying smart card is decremented immediately. The transaction information, including the card-to-card key and the load key for the paying smart card, is transmitted from the receiving smart card application to the on-line host system on a terminal. The on-line host system authenticates the card-to-card and load keys for the paying card, and transmits a message to the receiving card authorizing deletion of the permanent memo, whereupon the permanent memo is deleted from the receiving card, and the load value of the receiving card is incremented by the transaction amount. The on-line host system also logs a reconciliation of the transaction between the paying card and the receiving card to the tracking system.

Additional objects, advantages and novel features of the invention will be set forth in part in the description which follows, and in part will become more apparent to those skilled in the art upon examination of the following, or may be learned by practice of the invention.

DETAILED DESCRIPTION

Figure 1:
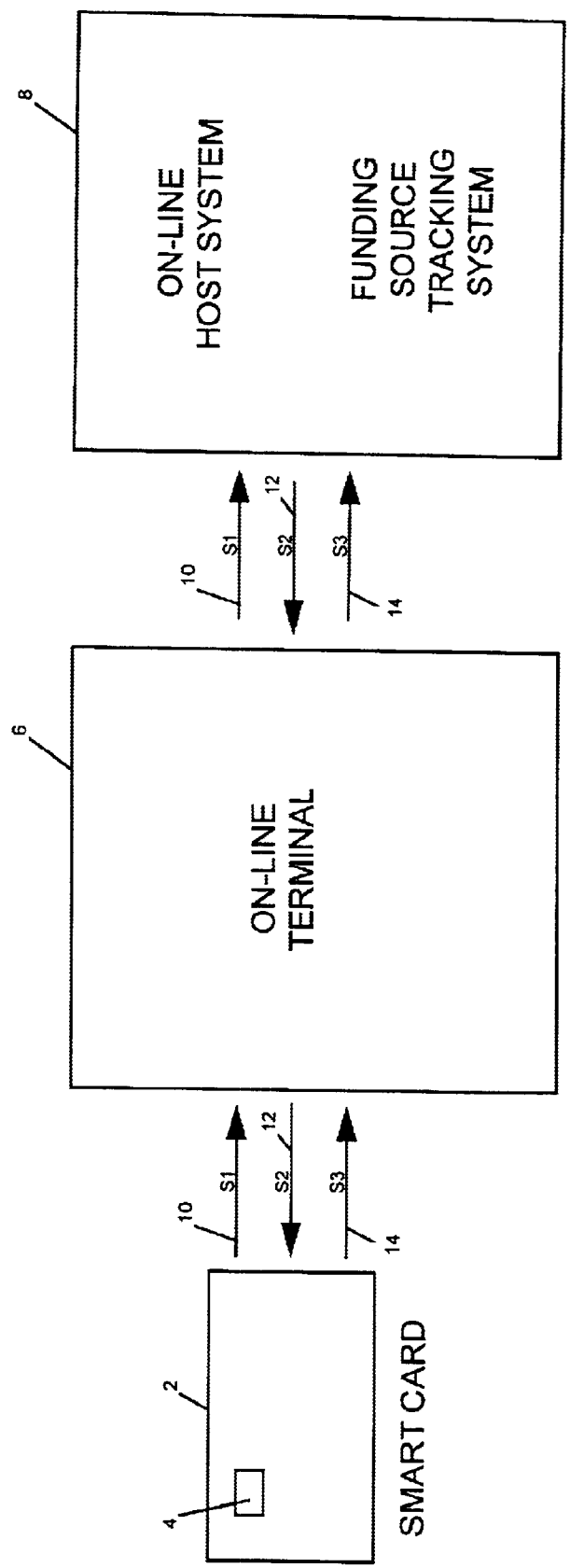
FIG. 1 is a flow chart which illustrates schematically the key components and flow of information between the key components for a typical on-line transaction with a smart card.

Referring now in detail to an embodiment of the invention, an embodiment of which is illustrated in the accompanying drawings, FIG. 1 is a flow chart which illustrates schematically the key components and flow of information between the key components for a typical on-line transaction with a smart card. Referring to FIG. 1, a smart card 2 embedded with microprocessor chip 4 is inserted into an on-line device, such as terminal 6, connected to a host system 8, and a series of messages are generated between the smart card 2 and the host system 6. A request message 10, known as an S1 message with a secret load key for smart card 2 is transmitted from card 2 to host system 8. Host system 8 receives the message, authenticates the load key, confirms a funding source, and transmits an authorizing message 12 known as an S2 message, to card 2. In response to the S2 message, the smart card 2, returns a load confirmation message 14, known as an S3 message to host system 8. Generally, the on-line transaction results in an immediate updated load value of smart card 2 and an immediate reconciliation with the tracking system of on-line host system 8.

Figure 2:
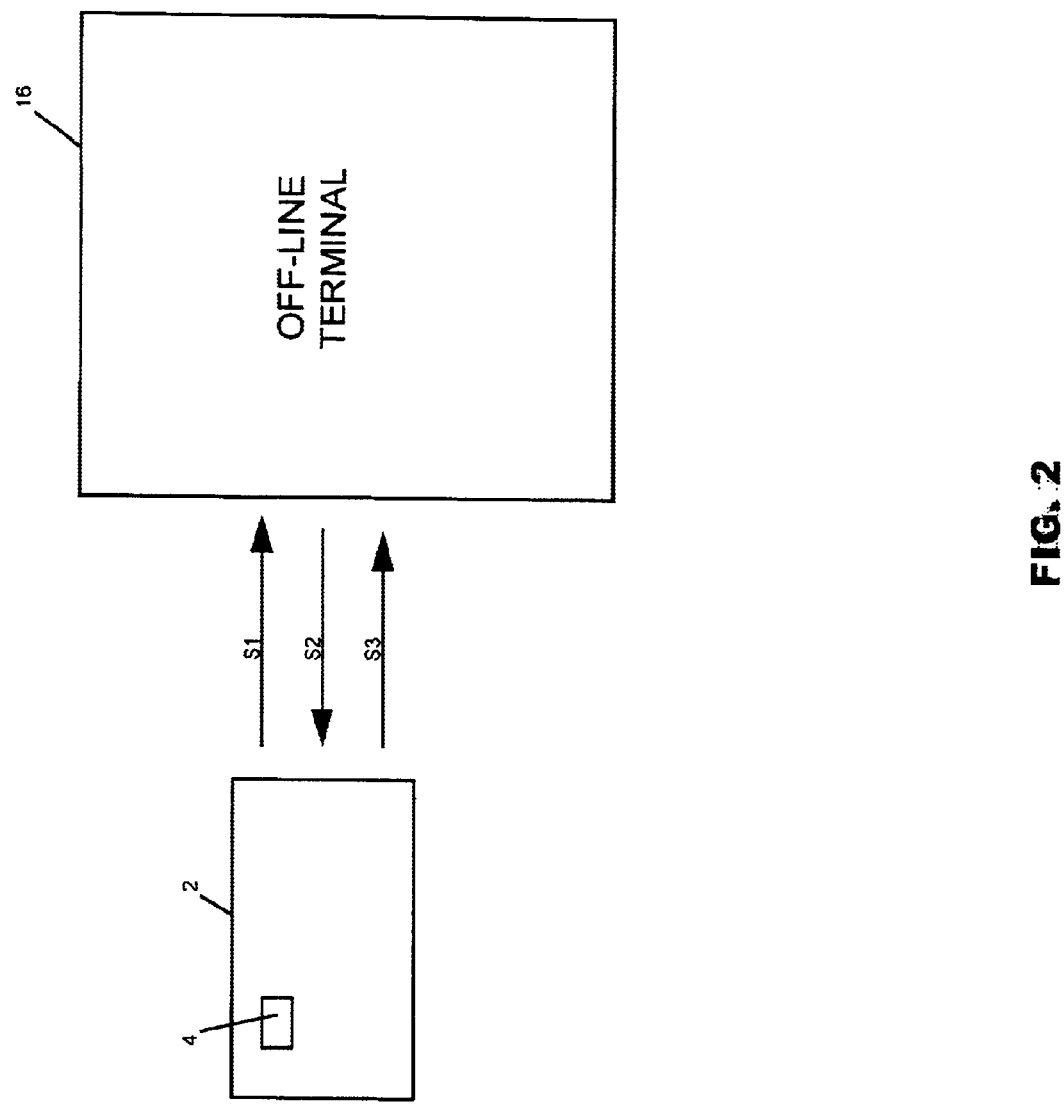
FIG. 2 is a flow chart which illustrates schematically the key components and flow of information between the key components for a typical off-line transaction between a smart card and a remote or off-line device.

FIG. 2 is a flow chart which illustrates schematically the key components and the flow of information between the key components for a typical off-line transaction between a smart card and an off-line device. Referring to FIG. 2, an off-line transaction is typically made by inserting card 2 embedded with microprocessor chip 4 into off-line terminal 16 that is not connected to the on-line host system, such as a remote ATM, an off-line merchant terminal, a PC, or a smart card compatible cellular phone. In an off-line transaction, while the transaction results in an immediate updated load value of smart card 2, the updated load value of the card 2 is not immediately known by the on-line host system 8, and the off-line transaction potentially may never be known to on-line host system 8.

Figure 3:
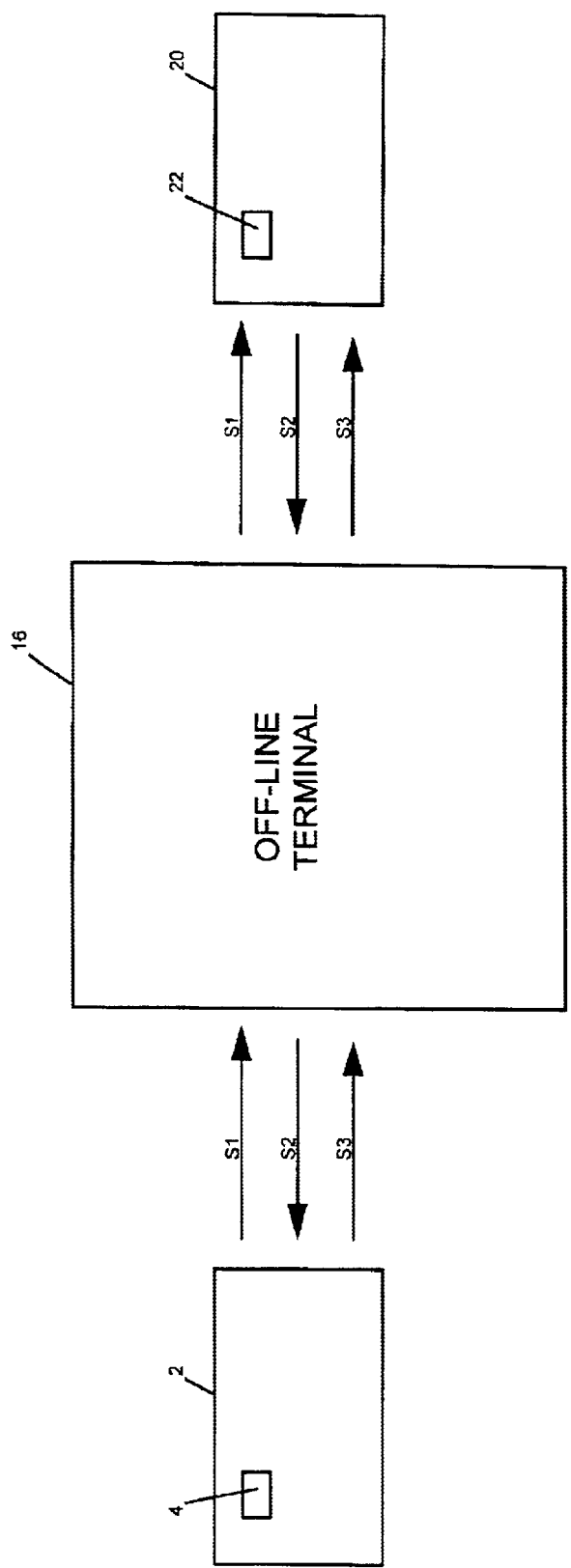
FIG. 3 is a flow chart which illustrates the key components and the flow of information between the key components for a typical card-to-card transaction between two smart cards, for example, at a remote or off-line terminal.
Figure 4:
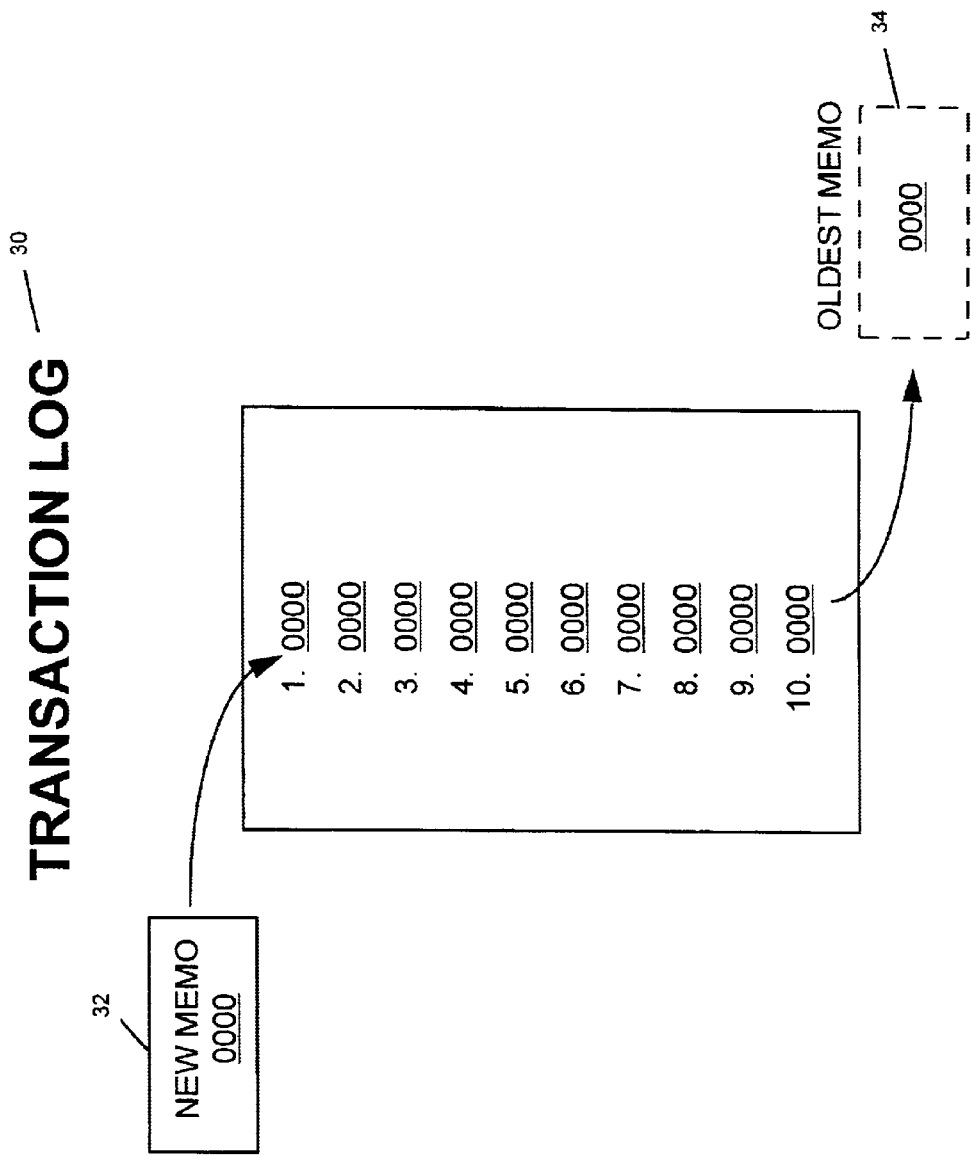
FIG. 4 is a chart representing a typical smart card transaction log which illustrates the typical process of a new transaction memo bumping the oldest previously logged transaction memo off the smart card transaction log.

FIG. 3 is a flow chart which illustrates the key components and the flow of information between the key components for a typical off-line card-to-card transaction between two smart cards, for example, at a remote or off-line terminal. Referring to FIG. 3, the off-line terminal 16, such as an electronic purse or wallet, is typically used to make an off-line transfer of value between two smart cards, such as card 2 imbedded with microprocessor chip 4 and a second card 20 imbedded with a microprocessor chip 22. A memo documenting the transfer is posted to a transaction log within the memory of each microprocessor chip 4, 22 of the respective smart cards 2, 20. The memo documenting the transfer is transient or temporary in nature in that the transaction log of each of chips 4, 22 has a limited capacity, for example, for storing only the immediately preceding 10 transactions. Thus, when the transaction log is filled with 10 preceding transactions, a succeeding transaction bumps the oldest previously stored transaction off the transaction log. FIG. 4 is a chart depicting a typical smart card transaction log 30 which illustrates the process of a new transaction memo 32 bumping the oldest previously logged transaction memo 34 off the transaction log.

Figure 5:
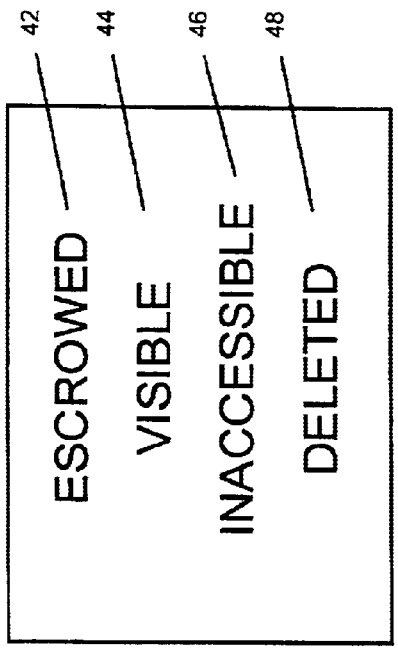
FIG. 5 is a table which illustrates the key characteristics of the permanent smart card load/unload memo for an embodiment of the present invention.

In an embodiment of the present invention, a permanent memo posting system is integrated with each smart card to account for off-line smart card transactions and to reconcile off-line transactions with the on-line host system 8. FIG. 5 is a table which illustrates the key characteristics of a permanent smart card load or unload memo for an embodiment of the present invention. Referring to FIG. 5, in using a smart card for an off-line transaction, permanent memo 40 is posted to the smart card for the amount of the transaction, as well as to the device, such as another smart card, with which the smart card interacts. For example, in a card-to-card transaction, permanent load/unload memo 40, corresponding to the transaction, is posted to each smart card. Essentially, the key features of the permanent memo 40 provide that prior to reconciling the respective smart cards with on-line system 8, the amount of the permanent load/unload memo is held in escrow as illustrated at 42. As illustrated at 44, the amount of the permanent load/unload memo can be seen but, as illustrated at 46, it is not accessible by the cardholder. When the transaction information in the permanent memo 40 is transmitted to and stored in the host on-line system 8, it is no longer needed and therefore permanent memo 40 is deleted as illustrated at 48.

Figure 6:
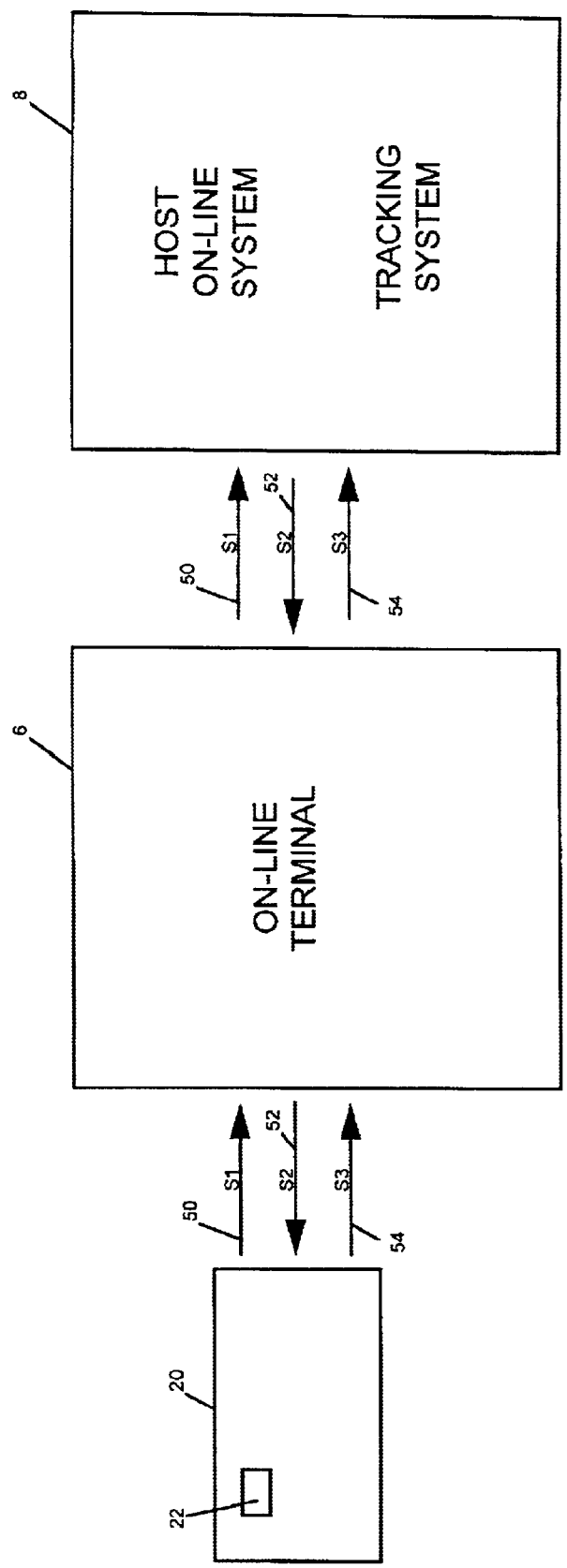
FIG. 6 is a flow chart which illustrates the key components and the flow of information between the key components in the process of connecting a smart card storing a permanent load memo to the on-line host system for an embodiment of the present invention.

FIG. 6 is a flow chart which shows the key components and the flow of information between the key components in the process of connecting a smart card 20 storing a permanent load memo to the on-line host system 8 for an embodiment of the present invention. For example, in a card-to-card transfer as shown in FIG. 3, card 2 transfers value to card 20 in an off-line transaction at off-line terminal 16. A permanent load/unload memo 40 corresponding to the transaction is posted to each of smart cards 2 and 20, instead of a transient or temporary transaction memo. When card 20 goes on-line, for example, at on-line terminal 6 as shown in FIG. 6, the permanent load memo 40 signed with the secret load key for card 2 is transmitted as the funding source for the standard load request or S1 message 50. The on-line system 8 authenticates the secret load key of card 2, and then returns a load authorization or S2 message 52 to card 20 with the value of the permanent load memo 40. Also, the on-line system 8 logs into a transaction tracking system the value of the load to card 20. The permanent load memo entry 40 is then canceled on card 20, and card 20 generates an S3 confirmation message 54 back to on-line system 8 confirming the load transaction. Thus, a complete audit trail of the load transaction is provided.

Figure 7:
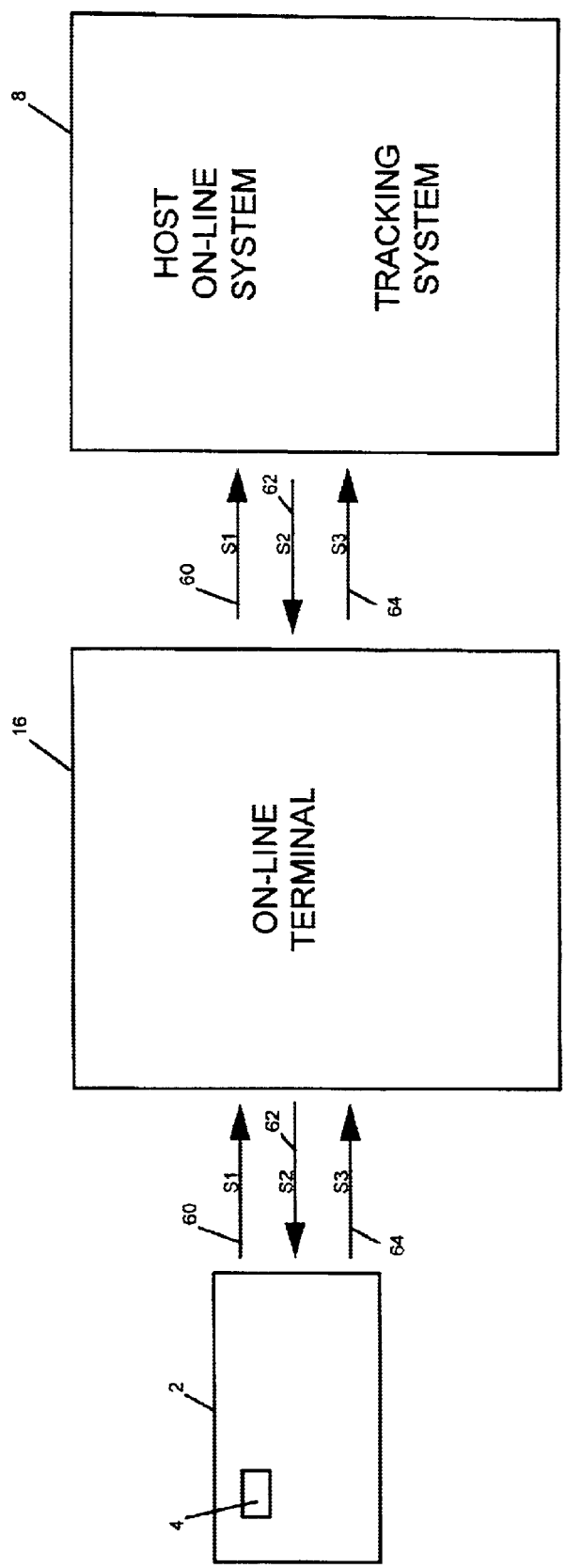
FIG. 7 is a flow chart which shows the key components and the flow of information between the key components in the process of connecting a smart card storing a permanent unload memo to the on-line host system for a embodiment of the present invention.

In an embodiment of the present invention, the permanent unload memo 40 on card 2 is handled similarly. FIG. 7 is a flow chart which shows the key components and the flow of information between the key components in the process of connecting smart card 2 storing a permanent unload memo 40 to the on-line host system 8 for an embodiment of the present invention. When card 2 goes on-line, for example, at on-line terminal 16, the unload memo 40 signed with the secret load key of card 20 is sent to the on-line system 8 as an S1 request message 60. The on-line system 8 authenticates the S1 message 60 and transmits an S2 authorization message 62 to card 2, reducing the load value of card 2 by the unload memo amount and clearing the permanent unload memo 40. Likewise, the host on-line system 8 logs the transaction to the transaction tracking system. Card 2 generates an appropriate S3 message 64 back to the on-line system 8 confirming the unload transaction. Thus, a complete audit trail of the unload transaction is also provided.

An embodiment of the present invention allows the on-line system 8 to create an audit trail from both sides of a card-to-card transaction. An off-line transaction illustrated, for example, in FIG. 3 between smart cards 2 and 20 are permanently stored in a permanent memo on each card until an a connection is made to on-line system 8 as illustrated, for example, in FIGS. 6 and 7. When the connection is made, the on-line system 8 officially adjusts the balance for the account on smart card 2 or smart card 20, and also in the on-line system 8, based on the amount of the permanent load/unload memo 40. The permanent load/unload memo 40 can then be removed from cards 2 and 20, respectively. Additionally, the signed key for smart card 2 or smart card 20 in the permanent load/unload memo 40 alerts the on-line system 8 of the source of the transaction. When the source of the transaction is another smart card, the transaction remains open in the tracking system of on-line host system 8 until the other smart card connects with on-line system 8 and the matching signed key for the other smart card is found. This allows full tracking and accountability of all transactions.

Figure 8:
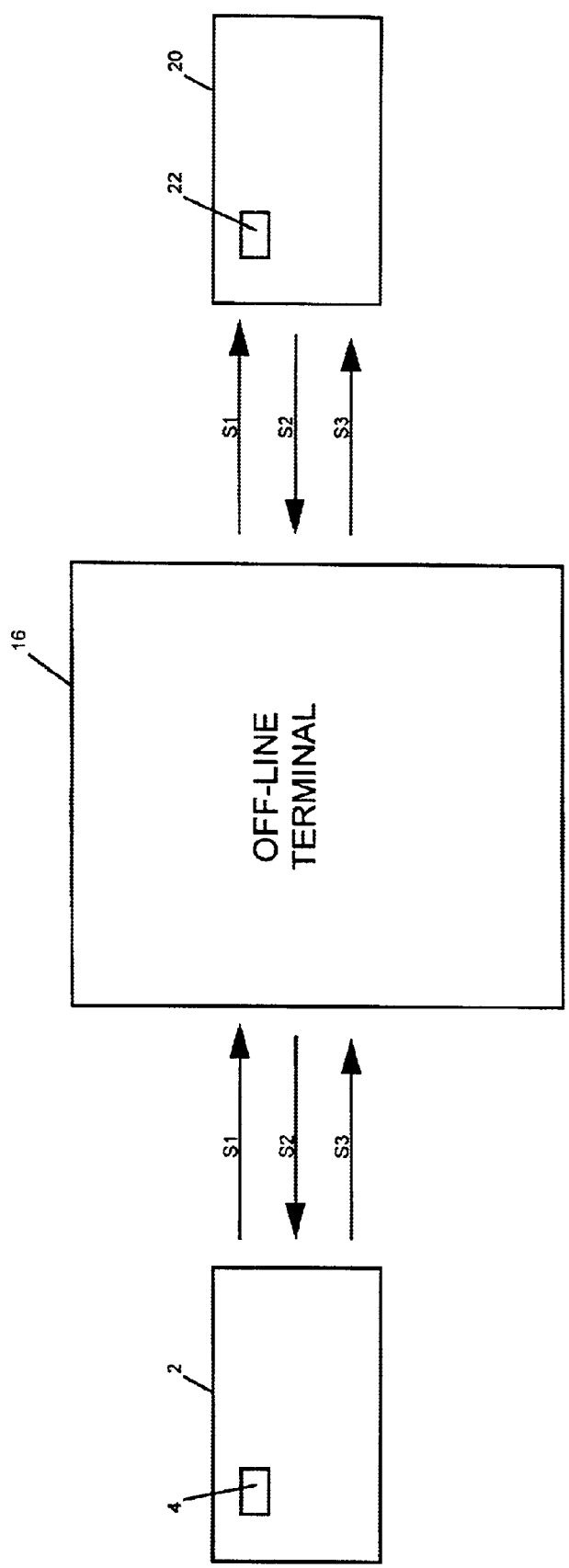
FIG. 8 is a flow chart which shows the key components and the flow of information between the key components in a transaction between two smart cards at an off-line terminal using the card-to-card key for an embodiment of the present invention.

An alternate embodiment of the present invention advantageously provides for a permanent memo on only one of the cards involved in a card-to-card transaction. In an alternative embodiment of the present invention, the card that is receiving value is made to look like an on-line merchant terminal. As illustrated in FIG. 1, a card 2 interacting, for example, with on-line merchant terminal 6 does not require a permanent load/unload memo 40 for the transaction, because both the card 2 and on-line system 8 are immediately updated. Thus, in the alternative embodiment, the relationship between the paying card and the receiving card is equivalent to the relationship between card 2 and on-line merchant terminal 8, as shown in FIG. 1. In the alternative embodiment, the receiving card is recognized as a pseudo-merchant terminal by providing both cards in the transaction with an additional key. Typically, smart cards have a load key to load and unload value, and a transaction key to track the transaction. An alternative embodiment of the present invention provides each card with a new key, called a card-to-card key. FIG. 8 is a flow chart which shows the key components and the flow of information between the key components in a transaction between two smart cards at an off-line terminal using a card-to-card key for an embodiment of the present invention. The card-to-card key allows a debit to immediately occur in the paying card, such as card 2, without requiring a permanent unload memo on card 2, and a credit to be appended to the receiving card, such as card 20, with a permanent memo and the signed card-to-card key that contains information from the paying card 2. The credit on the receiving card 20 is viewable, but not usable until card 20 goes on-line and reconciles the transaction with the card-to-card key from paying card 2 to the on-line system 8.

Figure 9:
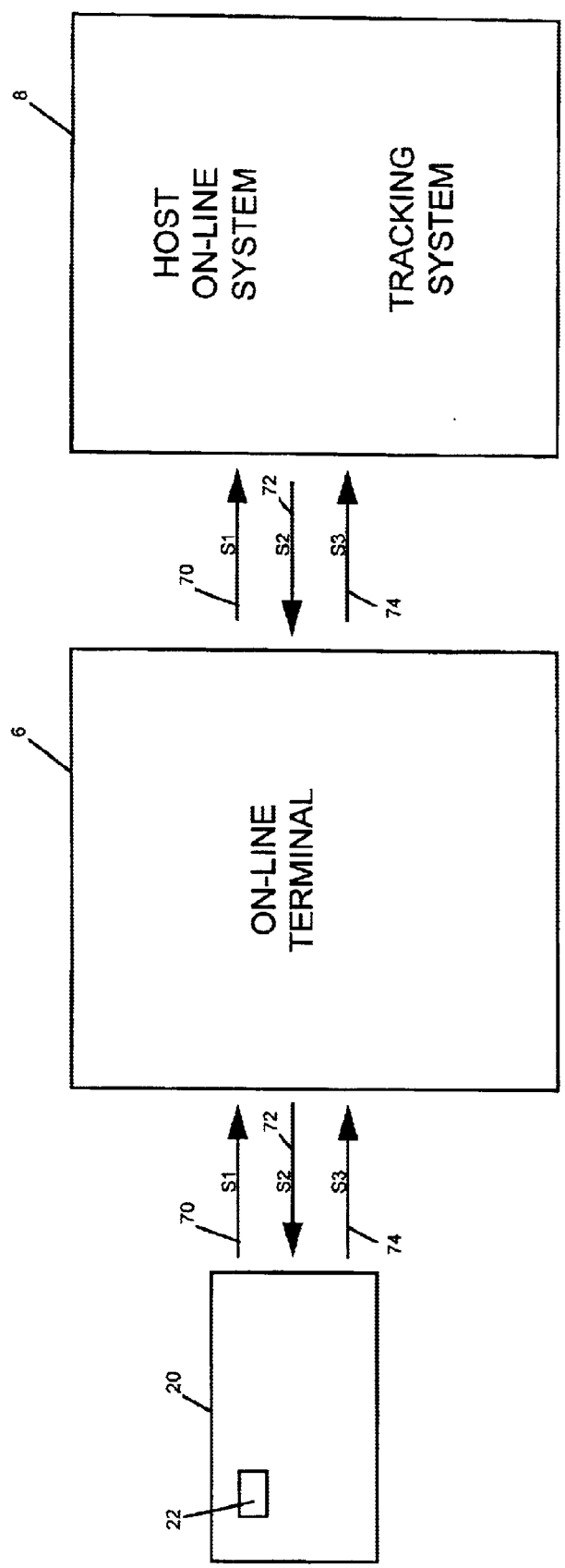
FIG. 9 is a flow chart which shows the key components and flow of information between the key components in an on-line reconciliation using the receiving card with the card-to-card key for the paying card stored in a permanent memo on the receiving card for an embodiment of the present invention.

FIG. 9 is a flow chart which shows the key components and flow of information between the key components in an on-line reconciliation using the receiving card 20 with a card-to-card key from the paying card 2 for an embodiment of the present invention. In the on-line reconciliation, the permanent memo on receiving card 20 is cleared and the credit value is loaded onto card 20. This simplifies the process, because paying card 2 need not be settled or adjusted. Paying card 2 requires no further processing, because the information of the transaction is included in the settlement of receiving card 20. Referring to FIG. 9, the permanent credit memo appended to card 20, as a pseudo-merchant terminal, is like an S1 request message 70. The S1 request message 70 includes the serial number of card 2 as well as the credit or load amount. Upon card 20 connecting with the on-line system 8, system 8 validates both cards 2 and 20 and, if approved, transmits an S2 authorizing message 72 back to card 20 in the amount of the credit. Card 20 then responds with an S3 message 74 to confirm that the transaction has been completed. This series of signals 70, 72, and 74, results in the on-line balances of card 2 and card 20 being adjusted, respectively, by the load amount. Thus, a complete audit trail is provided by the card-to-card key which allows placing a permanent memo only on receiving card 20.

In an embodiment of the present invention, a memo form of the transaction is used to transfer, for example, $10 from the paying card 2 to the receiving card 20. When a card, such as a VISA Cash card, is loaded, a message is generated and given to the card. The card encrypts the message, and the message becomes what is referred to as the S1 message. The S1 message is a message by which the card essentially requests an authorization to load a specific amount. The card signs the S1 request message with an internal load key of the card, which is a derivation of the master load key. The S1 message, along with the funding account, is sent to the central on-line system 8, as shown, for example, in FIG. 1.

In an embodiment of the present invention, at the central on-line system 8, the S1 message is broken apart into two parts. The encrypted S1 message is decrypted by the secret load key that is the master load key. If the S1 message is properly decrypted, then the S1 message has been authenticated, which means the card 2 is a good card, and the host on-line system 8 has access to the file on the particular card. Therefore, if there is any problem, the load transaction can be stopped. Once the card 2 has been authenticated for the load, the second part of the S1 message is sent to a funding source for authorization. The funding source may be the user's bank account or credit or the like. A message comes back from the funding account organization or funding source that says "yes." In other words, a second message is encrypted by the authorization source, which is referred to as the S2 message. The S2 message is sent back to the card 2.

In an embodiment of the present invention, the card 2 is essentially communicating with the S1 message directly with the central system 8. The terminal 6 is not really doing anything. The card 2 does the encryption and sends the S1 message, and the terminal 6 forwards it. In other words, the terminal 6, essentially just passes the S1 message through to the central system 8 for authorization. The same thing is true for the S2 message coming back from the authorization system. The S2 message is passed through the terminal 6 to the card 2. The card 2 decrypts the S2 message and, in decrypting the S2 message, there is a command in the S2 message to update the value on the card by the amount of the transaction.

In an embodiment of the present invention, the card 2 then returns an S3 message to the central system 8. The S3 message is another encrypted message, which says that the transaction has been completed. Therefore, there is a complete back and forth confirmation of the load transaction. If the S3 message is lost, the central authorization system 8 still accepts the transaction as completed. In other words, even though the S3 message may have been lost, for example, by the cardholder removing the card from the terminal 6 too soon, so that the transmission is interrupted or the like, the central system 8 accepts the transaction as completed. If the cardholder later learns that the cardholder's card 2 did not receive the load of value and complains to the bank, the bank can look up the transaction in the central system 8 for the particular card and confirm that a load operation was not completed. In this way, the cardholder can recover the missing money.

In an embodiment of the present invention, cardholders are able to transfer money between the respective cardholders' cards utilizing an off-line terminal 16, for example, a hand held electronic wallet into which both cards are inserted, as illustrated in FIG. 8. The electronic wallet 16 has a key pad by which the amount of money to be transferred from one card 2 to the other care 20 can be entered and the transfer executed. The transfer is not limited to transactions between two cardholders in the same place. For example, the transfer can likewise be done the same way over the Internet or in various other ways. For such transactions, the cardholders should have an audit trail for every transaction. However, if the transaction is done, for example, at home, the parties have no mechanism to get the transaction information into the central system 8 where an audit trail exists. An audit trail prevents fraud and allows tracking of the transactions, in the event it is necessary to have a record of transactions.

In an embodiment of the present invention, in the transaction between two cardholders to transfer value, for example $10, from one card 2 to another card 20 using an off-line terminal, such as the hand held device with a key pad, one cardholder tells his or her card 2 that he or she wants to transfer $10 to the other cardholder's card 20. The paying card 2 encrypts the message and essentially makes an S1 message and sends it to the receiving card 20. The receiving card 20 accepts the S1 message, but as a memo amount. The cardholder of receiving card 20 can see that his or her card has the memo amount in the card through a terminal or balance reader. However, the memo amount is not the main balance of the card 20. The card 20 has a main balance and an additional memo balance. The memo balance is not included in the main balance, but it is on the receiving card 20, and the cardholder can see it. On the other hand, the cardholder of the paying card 2 can see the memo amount, but it also has been deducted from the main balance in paying card 2. Therefore, the paying card 2 has both a new balance and the memo amount for the transaction.

In an embodiment of the present invention, the next time the cardholder of paying card 2 goes on-line to load the paying card, or goes on-line to the central system 8 for any reason, or the next time the cardholder of the receiving card 20 goes on-line to the central system 8, each card can now indicate to the central system 8 that it has a memo load on the card. Since it is a memo load in the form of an S1 message, the central system 8 accepts the information, because the S1 message is signed. In other words, since the S1 message is properly signed, the central system 8 can accept the memo S1 message. In the memo S1 message is the serial number for the paying card 2, because the paying card signed the S1 message. The central system 8 now can recover that number by decrypting the S1 message. Using that information, the central system 8 deducts the transaction amount from the card balance for the paying card 2 that is in the central system 8. The central system 8 uses that amount of money as the funding source and returns a normal S2 message to the receiving card 20, and the cardholder of the receiving card 20 gets the money and returns the S3 message as a normal transaction.

In an embodiment of the present invention, the only difference is that when the central system 8 sees the S1 message, and the fact that it is a memo posting from the receiving card 20, it uses that information in the S1 message as an authentication of the S1 message. However, the central system 8 uses the information to decrement the card balance for the paying card 2 in the main system and provides the receiving card 20 the funding source to send back the S2 message to update the receiving card. The S1 message that is sent out also confirms the fact that it is a memo posting and is encrypted and also includes the signature of the receiving card 20, so there are two signatures in the S1 message going forward. The paying card 2 signature is for the funding source, and the receiving card 20 signature enables the central system 8 to generate the S2 message, because it has the receiving card number. The central system 8 generates an S2 message around the paying card 2 number, so the receiving card 20 recognizes a load transaction. Thus, the central system 8 is updated.

In an embodiment of the present invention, the money is now on the receiving card 20, the memo is cleared, and the cardholder of the receiving card has the use of the money. The paying card 2 was already decremented by that amount of money, but when the cardholder of the paying card 2 goes on-line to do a load, the paying card provides the same information in a memo form. The message is encrypted. It may be referred to as a memo transaction, which goes to the central system 8 and is used as a mechanism, or it can be compared to the card account for the paying card 2, and if the card account has already been decremented, the memo is disregarded. If the card account has not been decremented, the memo is put in a separate file. If for some reason, such as the cardholder's loss of the receiving card 20, and the memo amount was some value that the cardholder wanted to recover, the cardholder can make a claim for that amount, because the card number for the receiving card 20 is in the memo, and the memo amount was also signed by the receiving card 20, as the memo has the signatures of both parties' cards.

In an embodiment of the present invention, each memo transaction that is stored on each card has the card signature for the receiving card 20 on it, and when the cardholder of the paying card 2 forwards the memo transaction from the paying card 2 to the central system 8, it is also signed by the paying card 2. This provides a complete audit trail loop. Because the memo transaction is signed by the paying card 2 as well as the receiving card number as part of the S1 message signature, the system 8 uses the paying card 2 as the funding source and can generate an S2 message that will load the receiving card 20. The next time the decremented paying card 2 goes on-line, it updates the central file 8. The paying card 2 confirms the transaction. If for some reason the cardholder of the paying card 2 goes on-line before the cardholder of the receiving card 20 does, the memo transaction goes into a queue, so that if the cardholder of the receiving card 20, for example, loses his or her card, the cardholder can make a claim based on the audit trail, because there is a complete audit trail that allows it.

An embodiment of the present invention has many other advantageous applications, such as in transportation or transit systems. A cardholder can utilize a smart card to pay for a train ride to a certain destination. For example, the cardholder may pay to ride the train to one stop, but may try to cheat the system by jumping the exit gate or staying on the train for extra stops. In that case, an embodiment of the present invention posts a permanent memo to the smart card for the maximum fare. Upon exiting the gate, the permanent memo is reconciled for the proper fare amount. If the smart card is not inserted into a terminal at the exit gate, then the maximum fare will be escrowed until the card is reconciled with the on-line system. Alternatively, a permanent memo can be posted for the full load value of the card. Thus, the card is useless until properly reconciled with the system.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of tracking and providing an audit trail of transactions with a smart card, comprising:

storing information representing a monetary transaction consisting at least in part of a transaction amount in a permanent memo on an application of a microprocessor chip of the smart card of at least a first cardholder;

reconciling a load value on the smart card by transmitting the stored transaction information from the permanent memo on the smart card application to an on-line host system;

deleting the permanent memo from the smart card application;

wherein storing information further comprises holding the transaction amount in escrow on the smart card application and excluding the escrowed transaction amount from the load value of the smart card until the permanent memo is deleted;

wherein the escrowed transaction amount represents one of a load transaction to the smart card and an unload transaction to the smart card, and deleting the permanent memo further comprises increasing the load value on the smart card by the escrowed transaction amount if the escrowed transaction amount represents a load transaction and decreasing the load value of the smart card by the escrowed transaction amount if the escrowed transaction amount represents an unload transaction; and wherein the monetary transaction comprises an off-line transaction with the smart card.

2. The method of claim 1, wherein the escrowed transaction amount is displayable from the smart card at a terminal.

3. The method of claim 1, wherein the escrowed transaction amount represents a load transaction to the smart card.

4. The method of claim 1, wherein the escrowed transaction amount represents an unload transaction to the smart card.

5. The method of claim 1, wherein the off-line transaction comprises a transaction between the smart card and an off-line device.

6. The method of claim 5, wherein transmitting the stored transaction information further comprises transmitting the information at a terminal.

7. The method of claim 6, wherein the stored transaction information further comprises a load key of the off-line device.

8. The method of claim 7, wherein deleting the permanent memo further comprises authenticating the load key of the off-line device by the host on-line system.

9. The method of claim 8, wherein deleting the permanent memo further comprises logging the transaction to a tracking system by the host on-line system.

10. The method claim 9, wherein deleting the permanent memo further comprises transmitting a message by the host on-line system to the smart card application authorizing the deletion.

11. The method of claim 10, wherein deleting the permanent memo comprises increasing the smart card load value by the transaction amount.

12. The method of claim 10, wherein deleting the permanent memo comprises decreasing the smart card load value by the transaction amount.

13. The method of claim 5, wherein the off-line device comprises a smart card of a second cardholder.

14. The method of claim 13, wherein storing information further comprises storing the information representing the monetary transaction in a permanent memo on an application of a microprocessor chip of the smart card of the second cardholder.

15. The method of claim 14, wherein storing information further comprises posting a transaction amount for the transaction on the respective applications of the smart cards.

16. The method of claim 15, wherein posting the transaction amount further comprises holding the transaction amount in escrow on the respective smart card applications until the permanent memo is deleted.

17. The method of claim 16, wherein the escrowed transaction amount is excluded from the load value of the respective smart cards.

18. The method of claim 16, wherein the escrowed transaction amount is displayable from the respective smart cards at a terminal.

19. The method of claim 16, wherein the escrowed transaction amount represents a load transaction to the smart card of one of the first and second cardholders and an unload transaction to the smart card of the other of the first and second cardholders.

20. The method of claim 14, wherein storing information further comprises storing a load key for the smart card of each of the first and second cardholders in the permanent memo of the smart card of the other of the first and second cardholders.

21. The method of claim 20, wherein transmitting the stored transaction information further comprises transmitting the information from the respective smart card applications at a terminal.

22. The method of claim 21, wherein deleting the permanent memo further comprises authenticating the respective load keys by the host on-line system.

23. The method of claim 22, wherein deleting the permanent memo further comprises transmitting a message by the host on-line system to the application of the respective smart cards authorizing the deletion.

24. The method of claim 23, wherein deleting the permanent memo further comprises deleting the permanent memo from the respective smart card applications.

25. The method of claim 24, wherein deleting the permanent memo further comprises increasing the load value of the smart card of one of the first and second cardholders by the transaction amount.

26. The method of claim 25, wherein deleting the permanent memo further comprises decreasing the load value of the smart card of the other of the first and second cardholders by the transaction amount.

27. The method of claim 26, wherein deleting the permanent memo further comprises logging a reconciliation of the transaction between the smart cards to a tracking system of the host on-line system.

28. The method of claim 3, wherein the monetary transaction comprises an off-line transaction with a smart card of a second cardholder.

29. The method of claim 28, wherein storing information further comprises storing the information representing the monetary transaction in a transaction log on an application of a microprocessor chip of the smart card of the second cardholder.

30. The method of claim 29, wherein storing the information further comprises storing a card-to-card key for the smart card of the second cardholder in the permanent memo on the smart card of the first cardholder.

31. The method of claim 30, therein storing the information further comprises posting a transaction amount for the transaction on the respective applications of the smart cards of the first and second cardholders.

32. The method of claim 31, wherein posting the transaction further comprises holding the transaction amount in escrow on the smart card application of the first card holder until the permanent memo is deleted.

33. The method of claim 32, wherein the escrowed transaction amount is excluded from the load value of the smart card of the first cardholder.

34. The method of claim 33, wherein transmitting the stored transaction information further comprises transmitting the information from the application of the smart card of the first cardholder at a terminal.

35. The method of claim 34, wherein deleting the permanent memo further comprises authenticating the card-to-card key by the host on-line system.

36. The method of claim 35, wherein deleting the permanent memo further comprises transmitting a message by the host on-line system to the application of the smart card of the first cardholder authorizing the deletion.

37. The method of claim 36, wherein deleting the permanent memo further comprises logging a reconciliation of the transaction between the smart cards to a tracking system by the host on-line system.

38. The method of claim 37, wherein deleting the permanent memo further comprises increasing the load value of the smart card of the first cardholder by the transaction amount.

39. A system for tracking and providing an audit trail of transactions with a smart card, comprising:

means for storing information representing a monetary transaction consisting at least in part of a transaction amount in a permanent memo on an application of a microprocessor chip of the smart card of at least a first cardholder;

means associated with the smart card for reconciling a load value on the smart card by transmitting the stored transaction information from the permanent memo on the smart card application to an on-line host system; and means associated with the smart card for deleting the permanent memo from the smart card;

wherein the means for storing the information is adapted for holding the transaction amount in escrow on the smart card application and excluding the escrowed transaction amount from the load value of the smart card until the permanent memo is deleted;

wherein the escrowed transaction amount represents one of a load transaction to the smart card and an unload transaction to the smart card, and the deleting means is adapted for increasing the load value on the smart card by the escrowed transaction amount if the escrowed transaction amount represents a load transaction and decreasing the load value of the smart card by the escrowed transaction amount if the escrowed transaction amount represents an unload transaction; and wherein the monetary transaction comprises an off-line transaction with the smart card.

40. The system of claim 39, wherein the means for storing information comprises an off-line terminal.

41. The system of claim 39, wherein the transmitting means comprises an on-line terminal.

42. The system of claim 39, wherein the deleting means comprises an on-line terminal.

43. A method of tracking and providing an audit trail of transactions with a smart card, comprising:

posting information representing an off-line monetary transaction between a smart card of a cardholder and an off-line device consisting at least in part of an amount for the transaction in one of a permanent load memo and a permanent unload memo on an application of a microprocessor chip of the smart card;

holding the amount of said one of the permanent load memo and the permanent unload memo in escrow on the smart card application upon completion of the off-line transaction between the smart card and the off-line device and prior to a reconciliation with an on-line host system;

if the transaction information is posted in the permanent load memo on the application of the microprocessor chip of the smart card, allowing the cardholder to view the amount of the permanent load memo without allowing the cardholder access to the amount of the permanent load memo prior to the reconciliation with the on-line host system;

if the transaction information is posted in the permanent unload memo on the application of the microprocessor chip of the smart card, allowing the cardholder to view the amount of the permanent unload memo while reducing a load balance on the smart card by the amount of the permanent unload memo prior to the reconciliation with the on-line host system;

on an occasion subsequent to completion of the off-line transaction between the smart card and the off-line device, allowing the cardholder to make a connection between the smart card application and the on-line host system to reconcile the smart card load balance by transmitting the information in said one of the permanent load and unload memo to the on-line host system;

if the information in said one of the permanent load and unload memo is transmitted to the on-line host system to reconcile the load balance on the smart card, deleting said one of the permanent load memo and the permanent unload memo from the smart card application; and if the information transmitted to the on-line host system is from the permanent load memo, incrementing the load balance on the smart card by the amount of the permanent load memo.

* * * * *